3,658,907
METHOD OF PREPARATION OF HOMOCAMPHOR AND HOMOEPICAMPHOR
Genevieve Chalier, 18 Chemin des Marronniers 38, and Andre Rassat, 5 Rue Marcellin Berthelot 38, both of Grenoble, France
No Drawing. Filed Oct. 7, 1968, Ser. No. 765,614
Claims priority, application France, Oct. 10, 1967, 123,822
Int. Cl. C07c 45/00
U.S. Cl. 260—586 A                                    1 Claim

ABSTRACT OF THE DISCLOSURE

A method of preparation of homocamphor and of homoepicamphor, characterized in that it comprises dissolving 1,8,8-trimethylbicyclo[3,2,1]-octane-2,4-dione in a mixture of hydrazine hydrate with an organic solvent which has a high boiling point and which is capable of supplying protons, heating and refluxing of said mixture, addition of a strong base after cooling of the mixture, distillation of the hydrazine hydrate and water, said distillation process being stopped from the moment of formation of the first crystals which appear in the condenser, cooling of the residue to room temperature, addition of water and phosphoric acid to the residue until a pH value lower than 2 is obtained and distillation of the water resulting in entrainment of the crystals of the desired products.

---

The present invention relates to a method of preparation of homocamphor and of homoepicamphor.

Homocamphor and homoepicamphor are valuable intermediates in the synthesis of products employed in perfumery and pharmacy. They constitute an intermediate product in the preparation of patchouli alcohol which is employed in perfumery. They can be employed as insecticides and in the soap industry. They are usually prepared from 1,8,8-trimethylbicyclo[3,2,1]-octane-2,4-dione (compound I) which is obtained as a result of the action of diazomethane on camphoquinone (Quinkert and Moschel, Chem. Ber. 98, 2742–2753 (1965). Starting from compound (I), there are successively prepared the methyl or ethyl ethers (compounds IIa and IIb), for example as a result of the action of diazomethane on compound (I) which is dissolved in benzene and methanol, then 5,8,8-trimethylbicyclo[3,2,1]-octene-3-one 2 and 1,8,8-trimethylbicyclo[3,2,1]-octene-3-one 2 (compounds IIIa and IIIb) as a result of action on compounds IIa and IIb which are dissolved in anhydrous ethyl oxide of LiAlH$_4$; the compounds IIIa and IIIb are then reduced by hydrogen in the presence of a catalyst such as palladium-carbonate of calcium in order to obtain respectively homocamphor (compound IVa) and homoepicamphor (compound IVb) (Favre and Marinier, Canad. J. Chem. 34, 1329–1339 (1956).

The preparation of these compounds can be represented diagrammatically by the following reactions:

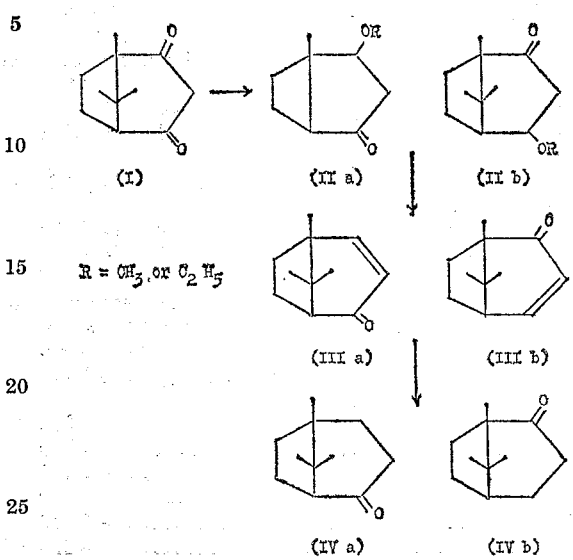

This method of preparation of homocamphor and of homoepicamphor takes a relatively long time to carry out, is complex and entails the preparation of a number of intermediate products.

The method in accordance with the invention provides a substantial simplification in the modes of preparation which have been known up to the present time. Thus, homocamphor and homoepicamphor can be obtained in a single stage from β-diketone (compound I).

The method which is proposed comprises dissolving β-diketone in a mixture of hydrazine hydrate with an organic solvent which has a high boiling point and which is capable of supplying protons, reflux heating of said mixture, addition of a strong base after cooling of the mixture, distillation of the hydrazine hydrate and water and processing the residue in order to isolate the desired product.

The organic solvent employed is advantageously diethylene glycol.

In a first alternative form of execution of the method, the residue is heated and refluxed, then treated with a solvent in which homocamphor and homoepicamphor are dissolved.

In a second alternative form of execution which must be considered as the preferred mode of application of the invention, the distillation process is stopped from the moment of formation of the first crystals consisting of 1,8,8-trimethylbicyclo(3,2,1)-octane which appear in the condenser. The residue is cooled to room temperature, water and phorphoric acid are added thereto until a pH value lower than 2 is obtained. The water is distilled and entrains the crystals of the desired products.

A better understanding of the invention will be gained from two examples of preparation of homocamphor and homoepicamphor in accordance with both modes of execution.

EXAMPLE I

There were dissolved in a 3-liter balloon flask 37 g. of β-diketone (compound I) in a mixture of 1000 ml. of diethylene glycol and 700 ml. of hydrazine hydrate. The solution was heated and refluxed over a period of 3 hours. After cooling to 50° C., 100 g. of potassium in pellet form were then added, followed by rapid distillation of the hydrazine hydrate and water. When the temperature reached 180° C., cooling was then effected and the distillation system was replaced by a straight condenser (length 50 cm., internal diameter 2 cm.), heating and refluxing being then carried out for a period of one and one-half hours. The crystals which had obstructed the reflux condenser were removed from time to time by means of a glass rod. These crystals were re-treated in ether. After evaporation of the solvent, 14 g. of crystals were collected. A chromatography on 500 g. of alumina made it possible to separate by elution:

(a) With petroleum ether: 12.75 g. of white crystals constituted by homocamphane.

(b) With ether: 1.20 g. of crystals constituted by homocamphor which melts at 174°–180° C. (M.P. in literature=189°–193° C.). The infra-red spectrum of this product was mainly characterized by the presence of a C=O band at 1710 cm.$^{-1}$ and a CH$_2$ band reduction of the C=O group) at 1425 cm.$^{-1}$. The ultra-violet spectrum in methanol shows an absorption at $\lambda_{max.}$=282 mμ. The rotary dispersion in methanol was:

| | Mμ |
|---|---|
| λ230 | +700 |
| λ270 | +2,100 |
| λ290 | 0 |
| λ312.5 | −2,580 |
| λ589 | −220 |

EXAMPLE 2

6 g. of 1,8,8-trimethylbicyclo[3,2,1]-octane-2,4-dione were dissolved in 102 ml. of hydrazine hydrate and 600 ml. of diethylene glycol. The solution was heated and refluxed for a period of 4 hours. After cooling to approximately 50° C., there were added 18 g. of potassium in pellet form and the water and hydrazine hydrate were distilled. Heating was stopped from the moment of appearance of the first crystals of 1,8-trimethylbicyclo-(3,2,1)-octane in the condenser and the solution was cooled to ordinary temperature. There were added 300 ml. of water and concentrated phosphoric acid until a pH value equal to 1 was obtained. The solution was allowed to stand overnight, the water was then distilled and entrained the crystals.

After extraction of the distillate with petroleum ether, washing with N-sulphuric acid and distillation of the solvent, there were obtained 2.15 g. of white crystals constituted by a mixture of homocamphor, homocamphane and homoepicamphor.

A chromatography on 100 g. of alumina made it possible to separate by successive elution:

(a) With petroleum ether: traces of homocamphane, (b) With a mixture of petroleum and ether (90–10): 1175 mg. of homocamphor which melts at 178–180° C. (M.P. in literature: 189–193° C.). The infra-red spectrum of this product was mainly characterized by the presence of a C=O band at 1710 cm.$^{-1}$ and a CH$_2$ band at 1425 cm.$^{-1}$. The rotatory dispersion in methanol was:

| | Mμ |
|---|---|
| λ230 | +700 |
| λ270 | +2,100 |
| λ290 | 0 |
| λ312.5 | −2,580 |
| λ589 | −220 |

(c) With the mixture of petroleum ether and ether (80–20)=505 mg. of homoepicamphor which melts at 202–204° C. The infra-red spectrum of this product was mainly characterized by the presence of a C=O band at 1710 cm.$^{-1}$ and a CH$_2$ band at 1425 cm.$^{-1}$. Its rotatory dispersion was:

| | Mμ |
|---|---|
| λ600 | +166 |
| λ310 | +2,420 |
| λ290 | +470 |
| λ589 | +73 |
| λ307.5 | +2,080 |
| λ280 | 0 |
| λ270 | −553 |
| λ250 | 0 |

What we claim is:

1. A method of preparation of homocamphor and of homoepicamphor, characterized in that it comprises dissolving 1,8,8-trimethylbicyclo[3,2,1]-octante-2,4-dione in a mixture of hydrazine hydrate with diethylene glycol, heating and refluxing of said mixture, addition of potassium after cooling of the mixture, distillation of the hydrazine hydrate and water, said distillation process being stopped from the moment of formation of the first crystals which appear in the condenser, cooling of the residue to room temperature, addition of water and phosphoric acid to the residue until a pH value lower than 2 is obtained and distillation of the water resulting in entrainment of the crystals of the desired products.

References Cited

Mazoor-i-Khuda et al., Chem. Abst., vol. 58, p. 3998 c, 1963.

Eistert et al., Chem. Abst., vol. 58, p. 8923 c, 1963.

Faure et al., Chem. Abst., vol. 52, p. 4559 a, 1958.

Faure et al., Chem. Abst., vol. 53, p. 18084 g, 1959.

BERNARD HELFIN, Primary Examiner

N. MORGENSTERN, Assistant Examiner

U.S. Cl. X.R.

260—631.5, 343